Sept. 2, 1958  G. J. VOELZ  2,850,060
CHECKERING MACHINE
Filed March 27, 1957  4 Sheets-Sheet 1

INVENTOR.
GORDON J VOELZ
BY

Sept. 2, 1958  G. J. VOELZ  2,850,060
CHECKERING MACHINE
Filed March 27, 1957  4 Sheets-Sheet 4

*INVENTOR.*
GORDON J. VOELZ
*BY*
Richard S. Strickler

2,850,060

CHECKERING MACHINE

Gordon J. Voelz, New Haven, Conn., assignor to Olin Mathieson Chemical Corporation, a corporation of Virginia Application March 27, 1957, Serial No. 648,923

5 Claims. (Cl. 144—136)

This invention relates to checkering machines and in particular to checkering machines adapted to checker firearms stocks automatically.

The invention also relates to a process practiced by the operation of the machine.

It is a particular feature of the invention to provide a checkering machine having a novel indexing scheme.

It is a further object of the invention to provide an automatic checkering machine operative to checker a plurality of distinct areas of the stock simultaneously.

A further object of the invention is the provision of a checkering machine having a plurality of individual cutting heads all carried in a single carriage, each cutting head being operative automatically to mill grooves or threads in a work piece while the carriage is moved to and fro along the longitudinal axis of the work piece.

A further object of the present invention is the provision of a checkering machine wherein the basic motions utilized to checker a work piece embrace continuous rotation of the work piece and oscillation or translation of the carriage along a path generally parallel to the axis of rotation of the work.

A further object of the invention is the provision of a checkering machine having removable cam templates corresponding substantially to the checkering pattern desired.

It is a still further object to provide a checkering machine adapted to checker a generally cylindrical work piece in accordance with any desired pattern; the pattern change being accomplished by the substitution of cam templates corresponding to the desired pattern.

A machine embodying certain features of the present invention may include a frame, a rotatable work holder carried by the frame for supporting a work piece such as a gun stock, a carriage movably mounted in the frame and carrying a plurality of cutting heads disposed in circumferential array about the work piece, each said cutting head having a cutting element movable pivotally from a normal position in which there is no contact with the work piece to a cutting position, traverse means for oscillating the carriage to and fro within predetermined limits and along a path generally parallel to the longitudinal axis of the work piece, and cam templates rotatably mounted in the frame and adapted to rotate in synchronism with the work piece, control means carried by the carriage and cooperating with the cam templates effective selectively to control the pivotal position of the cutting elements with respect to the work piece thereby regulating the length and continuity of cuts.

It is entirely within the spirit and scope of the invention to arrange the machine to receive a plurality of work pieces arranged, for example, in tiers where a single set of control means regulates the checkering operations performed upon the individual work pieces.

The cutting heads and the cutting elements are suspended in the manner disclosed and described in a copending application entitled "Checkering Machine," filed March 5, 1957, by John Crowe, Serial No. 664,041.

In order to provide clearance between the cutting heads and the work during certain portions of the operating cycle of the present machine additional solenoids are utilized; however, in general, the pivotal motion of the cutting head from the normal position to the cutting position and the action of the cutting head followers or shoes is substantially as disclosed in said copending application.

As stated previously, among the principal features of the invention are a novel indexing system and the presentation of structure which is operative to checker at least two different areas of a gun stock simultaneously.

As described in said copending application, checkering frequently consists of the formation of small diamonds or pyramids upon the stock; the pattern is usually developed by milling, manually or otherwise, a plurality of parallel grooves having a predetermined lead angle. For descriptive purposes these grooves may be termed threads and are usually formed with a right-hand lead and with an intersecting left-hand lead. A plurality of spaced right-hand and left-hand threads results in the creation of small pyramid formations characterizing a knurled or roughened effect upon the surface of the stock.

The disclosed embodiment of the invention utilizes the carriage to move two oppositely disposed cutting heads (an upper head and a lower head) along the work piece. The upper head mills a left-hand thread while the lower head is utilized to mill a thread of the opposite hand. Both heads are under the control of electromagnets and cam templates so that the length and continuity of the threads are regulated to produce the desired checkering pattern or outline.

In order to insure a clean cut as the cutter engages the work, the carriage is disposed at an angle with respect to the axis of rotation of the work piece. In general, this angle approximates the lead angle.

It is entirely within the scope of the invention to utilize a drill or end mill type cutter and in that event it would not be necessary to dispose the carriage angularly with respect to the work. Furthermore, the invention is not intended to be limited to the disclosed number or arrangement of heads, it being obvious that a variety of dispositions and arrangements thereof are within the spirit and scope of the invention.

A traverse screw or distributor device is provided for returning the carriage to its starting point after each traversal of the work piece. A complete traversal or cycle consists of a forward stroke and a return stroke. One cutting head is conditioned to cut during one stroke of the carriage while the other head is conditioned to cut during the return stroke. Consequently, for purposes of explanation, one cutter may be considered to be in condition to cut only when the carriage is moving in the forward stroke while the opposite cutter is conditioned only when the carriage is accomplishing the return stroke.

For reasons of appearance and ornamentation, the checkering pattern is confined within a given area on the gun stock. Correspondingly, the included angle between the right-hand and left-hand threads or grooves and the spacing therebetween are both calculated to create an appearance and feel that is attractive to the sportsman.

Utilizing the principles of the present invention, one has only to determine the amount of traverse necessary to assure confinement of the checkering pattern within a given area on the gun stock. For example, assume that the lead angle of the thread desired is approximately 27½ degrees (measured from the axis of rotation of the work piece) and that the checkering pattern is to fall within an 8-inch span on the work. A traverse screw can readily be designed which will carry the carriage through the required stroke consistent with the given lead. In the embodiment of the invention disclosed herein, the traverse screw develops a 27½ degree lead angle during a 10-inch stroke upon each revolution of the work piece. Recognizing that the cutting elements do not cut continuous threads it has been determined, in the present example, that a 10-inch sweep or traverse of the carriage to and fro is sufficient to permit formation of threads of the length and continuity necessary to form the desired 8-inch pattern.

Obviously the invention is not limited to the lead angles, strokes and other dimensions set forth herein.

It is to be understood that as the carriage traverses the work in one direction a thread of one hand is milled by one cutter and upon its return stroke, a thread of the opposite hand is milled by the other cutter.

Indexing is accomplished by coordinating or interlocking the continuous rotation of the work piece and the traverse of the carriage. As stated previously, continuous rotation of the work piece through a given number of revolutions while the carriage accomplishes one stroke permits a given cutting head to cut the desired length of thread having the desired lead under the control of its corresponding cam template. Assuming that there is no indexing in the above cutting stroke, the carriage would return the cutting head to its starting point in the course of the carriage return stroke and the head would arrive at the same position with respect to the work piece at which it started; consequently, the next cut accomplished by the same cutting element would fall in the same groove.

To achieve indexing the work is rotated continuously said given number of revolutions plus an additional fraction of a revolution per stroke of the carriage where the fractional revolution is proportional to the distance (pitch) that is desired between threads.

It is well known that if the number of threads per inch, the lead angle, and the average diameter of the work piece are given, one can readily calculate, using well-known machine design practices, the number of revolutions or fractions thereof through which the work piece must be revolved per stroke of the carriage to develop the desired thread lead angle.

However, to provide indexing, i. e. space between successive threads, the work is revolved the required number of revolutions (as the carriage traverses the work) necessary to develop the desired lead plus a fraction of a revolution more. The additional fraction of a revolution constantly assures that when a given cutting head returns to its starting point after having milled a thread there will be presented to the cutter new uncut area whereupon the next thread will be milled generally parallel to the thread previously cut. The value of the fraction is, of course, proportional to the periphery of the work piece and the desired spacing between threads or grooves.

In the embodiment of the invention disclosed, the carriage is approximately 10 inches per 1¹⁵⁄₁₆₈ revolutions of the workpiece whose average diameter is 1.7 inches.

Correspondingly, it is entirely within the scope of the invention to include dwell periods, as may be desired, following either stroke. Furthermore, a wide variety of gear arrangements may be devised to vary the timing of the carriage strokes.

Other features and advantages of the present invention will become apparent from an examination of the succeeding specification when read in conjunction with the appended drawings in which.

Figure 1:
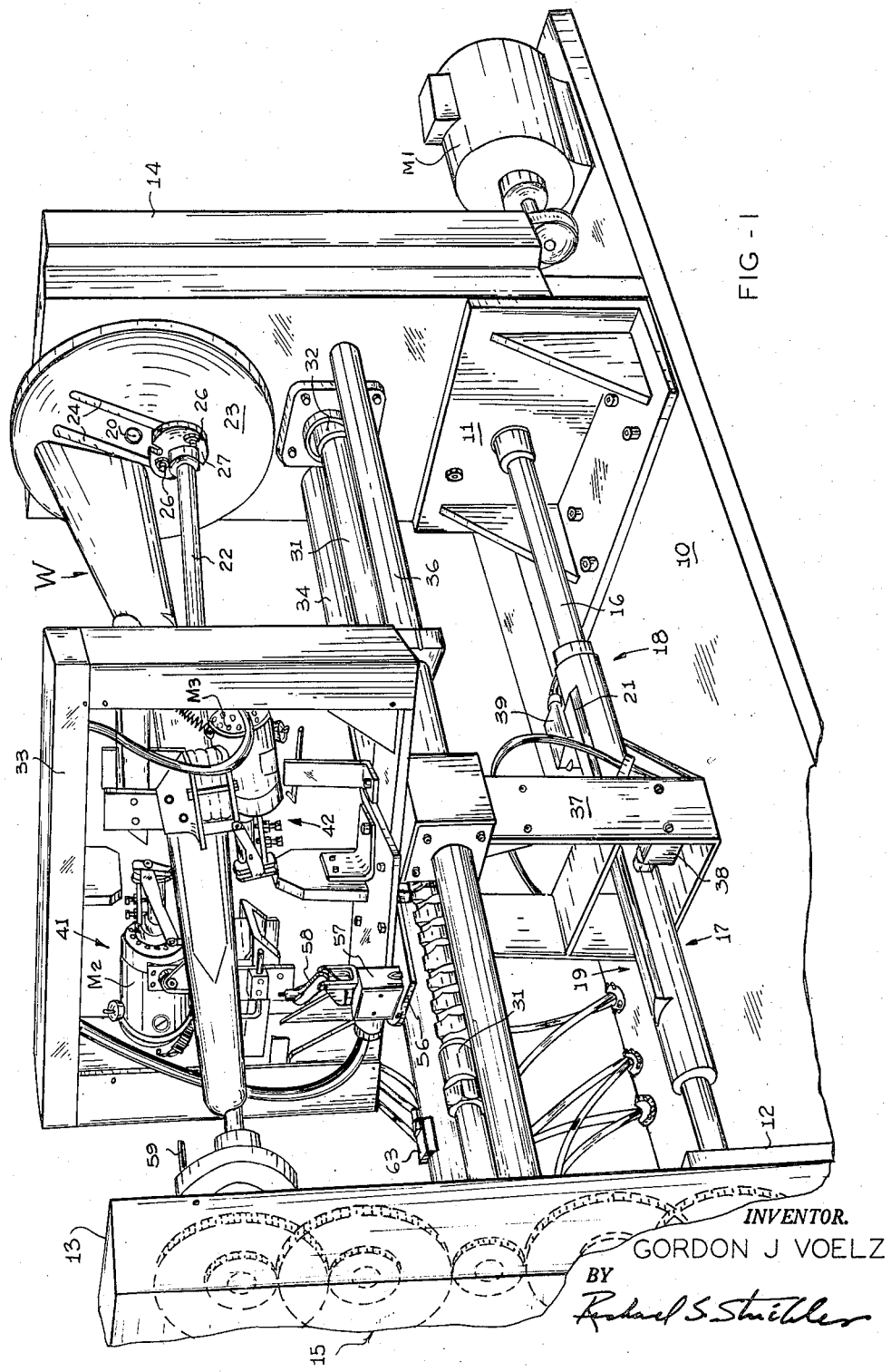
Fig. 1 is a perspective view of a checkering machine embracing the principles of the present invention.
Figure 2:
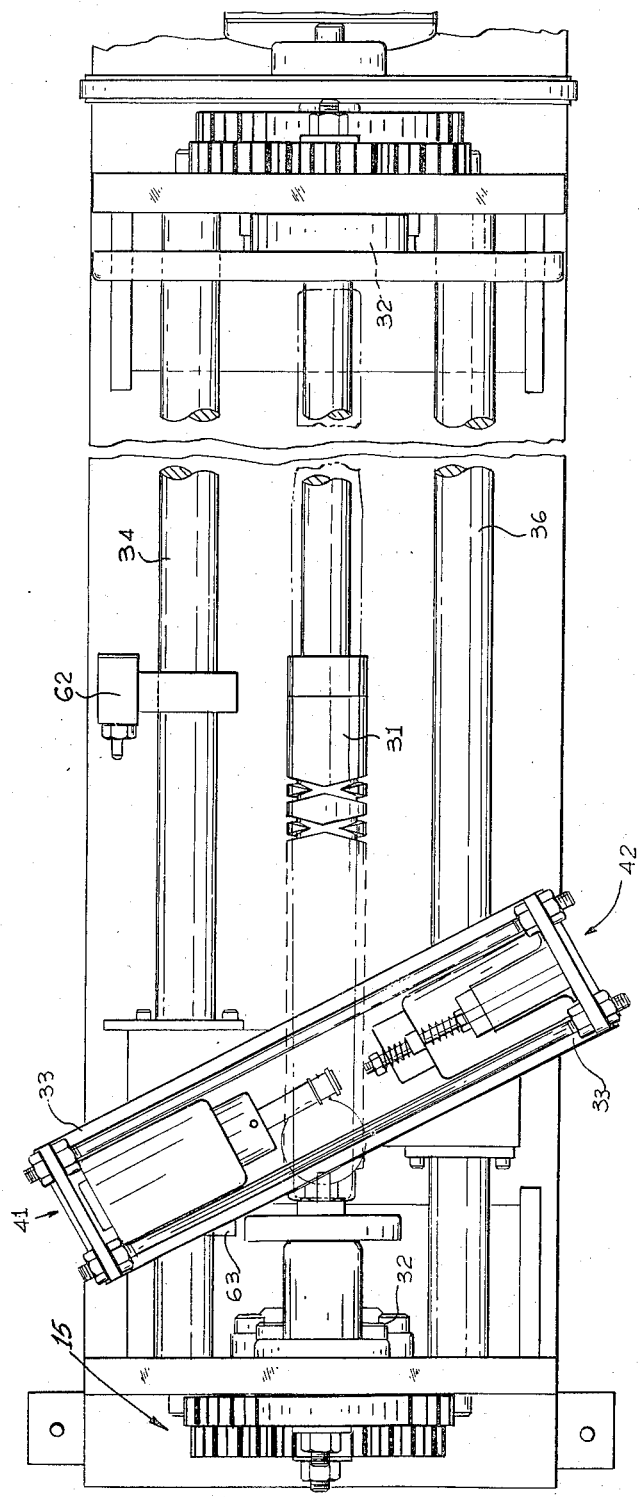
Fig. 2 is a plan view of the showing of Fig. 1 with certain portions thereof broken away.

Referring now in detail to Figs. 1 and 2, it is apparent that the disclosed embodiment of the present invention embraces a base plate 10 carrying a pair of opposed bracket members 11 and 12 each supporting corresponding gear boxes or housings 13 or 14. A main motor $M_1$ carried by the plate 10 is connected by suitable V belts to traverse screw 31 journaled in bearings 32—32. The screw 31 is suitably geared to cam shaft 16, journaled in the brackets 11 and 12.

The shaft 16 carries two pairs of cam templates indicated generally by the reference numerals 17 and 18. These templates are carried by split cylinders removably mounted on the shaft 16 and each pair consists of two opposed raised templates or plates, such as the templates 19 and 21 formed in the general configuration of the pattern to be checkered upon the gun stock. Although only one template 19 and one template 21 are shown, it is to be understood that there are two of each said templates. An additional template is mounted on the opposite side of the shaft 16 and is of generally the same configuration as those apparent in Fig. 1.

It is to be noted further that the cam templates of group 17 are utilized in cooperation with a follower in the form of a microswitch to control the generation of left-hand threads by the upper cutting head while the cams of group 18 are utilized in cooperation with a corresponding follower to control the generation of the right-hand threads by the lower head in a manner which will become more apparent hereinafter.

Journaled at the top of the gear boxes 13 and 14 is a shaft 22 adapted to receive a gun stock, indicated by the reference numeral W, and hereafter referred to as the work piece. The work piece W is suitably secured to the shaft 22 and it is to be noted that a plate 23 supported and driven by stub shaft 20 is provided with slots 24 cooperating with clamping bolts 26 carried by hub 27 to permit the right end of the shaft 22 to be adjusted radially with respect to the shaft 20.

The reason for the provision of the adjustment at the right end of the shaft 22 is as follows:

For considerations of design and pleasing appearance, there is a slight taper to the generally cylindrical forearm portion of the work piece in the area of the checkering, as shown in Fig. 1. Offsetting the gun stock radially in the appropriate direction tends to minimize the effect of the taper so that in the area of the center of the pattern, a point on the surface of the work piece describes a circle, as the work rotates, of a given diameter, while points on the extreme ends of the pattern describe circular paths having diameters deviating a minimum amount and substantially equal amounts from the diameter of the center circle.

Suitable gearing (Fig. 2) is provided to drive the shafts 16 and 22 continuously and at substantially the same speed.

As stated before, the traverse screw 31 is rotatably supported in bearings 32—32. The carriage 33 is connected to the traverse screw so that when the screw is revolved, the carriage is driven to and fro along the longitudinal axis of the screw in the fashion of a conventional level winding device. The traverse screw is suitably interlocked by gearing, indicated generally by the reference numeral 15, to the shafts 16 and 22 to rotate in a counterclockwise direction as viewed from the right end of Fig. 1. A pair of guide bars 34 and 36 are carried by the housings 13 and 14 and are utilized as ways to slidably support the carriage.

The carriage is formed with a depending frame or box 37 which in turn supports a pair of microswitches 38 and 39 each having cam followers adapted to engage corresponding templates 19 and 21 respectively as the carriage is moved to and fro.

As noted previously, the carriage frame 33 is disposed angularly with respect to the traverse screw 31. This angle corresponds generally to the lead angle of the grooves formed in the work piece.

Figure 3:
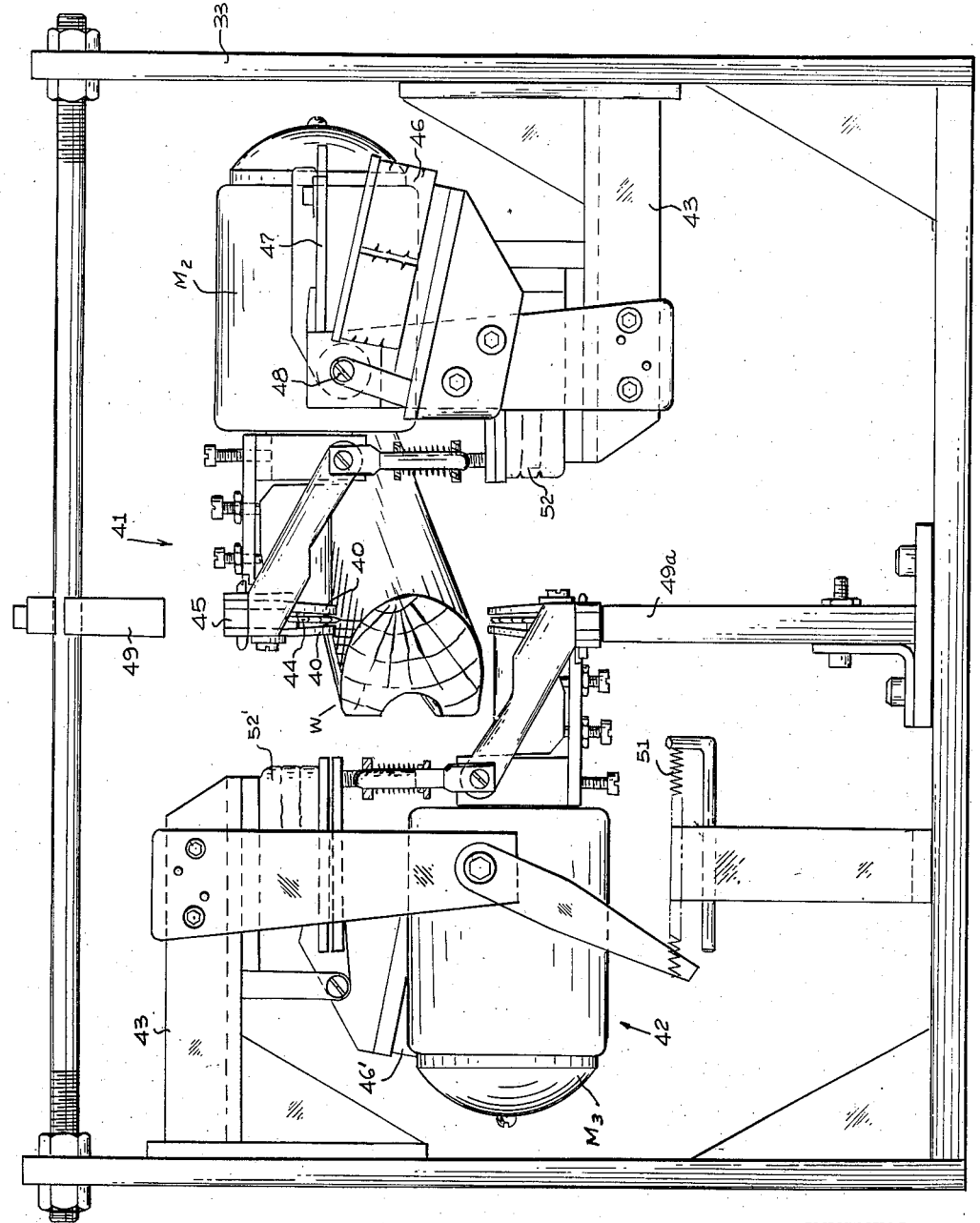
Fig. 3 is an enlarged view of a portion of Fig. 1 (as viewed from the rear) showing the scheme for mounting the cutting heads in the carriage.

Referring now in detail to Fig. 3, it will become apparent that the frame or carriage 33 carries a pair of opposed cutting heads indicated generally by the reference numerals 41 and 42. It is to be noted that the showing of Fig. 3 is a representation of the cutting heads as viewed from the rear of the showing of Fig. 1.

Since both cutting heads are mounted in substantially the same fashion and since both heads operate under the control of their corresponding cam templates 17 and 18, the details of only one cutting head will be described. As stated previously, the head mounting is generally the same as the cutting head disclosed in the copending Crowe application wherein a bracket 43 pivotally supports a motor $M_2$. The motor $M_2$ drives a circular cutting element 44 shown conditioned to cut and in actual cutting position with respect to the work piece W of Fig. 3. A solenoid 46 having an armature 47 is operative when energized in a manner which will become more apparent hereinafter to pivot the cutting head about the point 48 to cause the portion 45 of the head to come to rest against a stop 49. In this position the cutter 44 and its followers 40 are withdrawn clear of the work and the head is not in condition to cut.

A coil spring such as the spring 51 is utilized to urge the cutting head into engagement with the work and acts in opposition to the solenoid 46. Each cutting head carries an additional solenoid 52 utilized to move the cutting element relative to the followers 40 in the manner described in said copending application.

As stated above, cutting head 41 (Fig. 3) is in cutting positon. Its spring 51 (not shown) is hauling the head towards the work piece so that the followers 40 engage and ride upon the surface of the work piece. The solenoid 52 is energized under control of its microswitch 38 to move the rotating cutting element 44 relative to the followers 40 a predetermined distance so that a groove is being milled in the work piece. Referring to the cutting head 42, it is noted that its solenoid 46' is energized to move the cutting head against its stop 49a and the cutting element 44 thereof is withdrawn wherein solenoid 52' is deenergized.

Both solenoids 46 and 46' are sufficiently powerful to overcome their respective coil springs 51 to haul the heads away from the work and against the stops 49 and 49a as the solenoids are energized in response to suitable signals.

Thus, the cutting heads are provided with solenoids 46 and 46' respectively for hauling the cutting heads towards the stops 49 and 49a, springs 51 for hauling the cutting heads towards the work thereby conditioning the heads to cut, and solenoids 52 and 52' for moving the cutting elements 44 relative to the followers 40 into a cutting position.

Referring now to Fig. 1, it is apparent that the carriage 33 is fitted with a plate 56 carrying a microswitch 57 actuated by a pivotally mounted arm 58. This arms is adapted to engage a pin 59 carried by the left hub of the shaft 22. Cooperation between the arm 58 and the pin 59 is effective to open the normally closed microswitch 57 to shut down the machine.

The continuous indexing feature of the present invention is utilized to actuate the switch 57 in the following manner:

Assume that the carriage 33 is at its extreme left (Fig. 1) position and that the shaft 22 is revolved to the point that the pin 59 has just contacted the arm 58. Slight additional rotation of the shaft 22 in the direction of the arrow will cause the pin 59 to strike the arm 58 depressing it to open the switch 57 shutting down the machine. Additional over travel as the machine decelerates and stops will clear the arm 58. Assuming now that the start button is depressed setting the machine in continuous operation, continuous rotation of the shaft 22 and corresponding traverse of the carriage 33 will occur with no interference between the pin 59 and the arm 58 until the pin has indexed through 360 degrees.

Indexing of the pin occurs because of the increment of lead applied to accomplish spacing of threads previously described.

Figure 4:
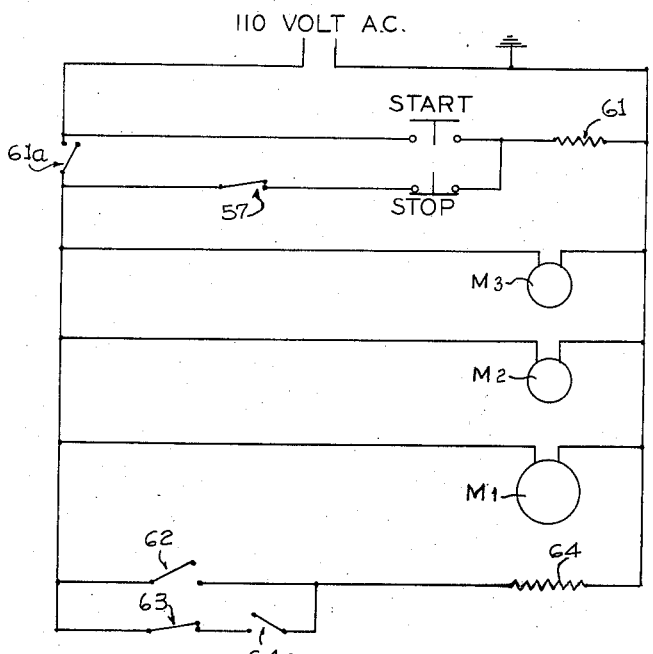
Fig. 4 is a wiring diagram of the A. C. circuit utilized to energize the various motors and the start-stop relays.
Figure 5:
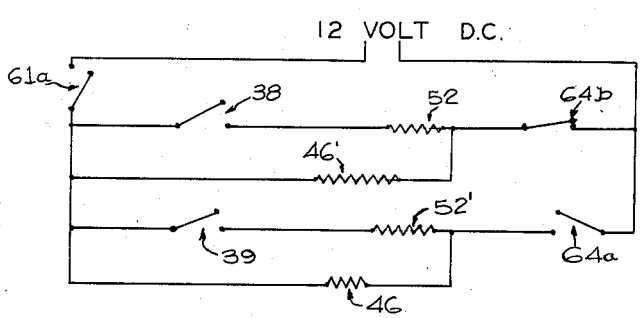
Fig. 5 is a wiring diagram of the D. C. circuit utilized to pivot the cutting heads under the control of the cam templates.
Figure 6:
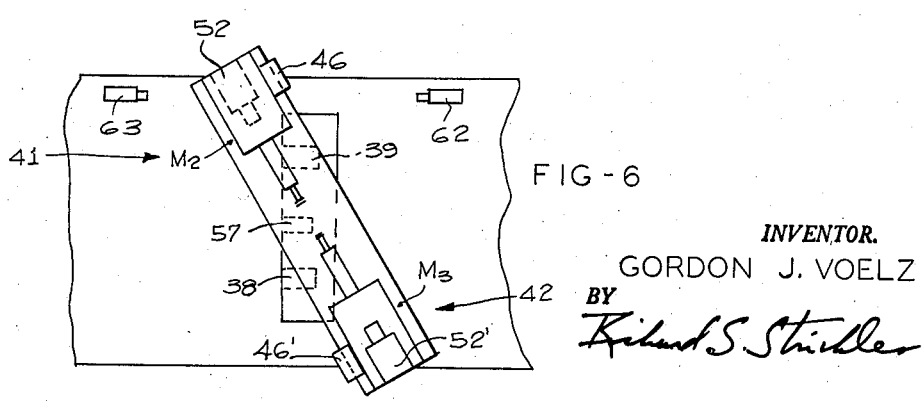
Fig. 6 is a plan view similar to Fig. 2 showing schematically the disposition of the various motors, solenoids and switches of Figs. 4 and 5.

Referring now to Figs. 4, 5 and 6, there is a showing of the circuitry as well as the disposition of the electrical elements utilized to operate and control main motors $M_1$, the cutting head motors $M_2$ and $M_3$ and the various solenoids. it is noted that the three motors $M_1$, $M_2$ and $M_3$ are wired in parallel across 110 volt supply line. A start button is operable to energize a holding magnet 61 which is in turn operative to close magnet contacts 61a to place motor $M_1$, $M_2$ and $M_3$ on the line and so close magnet contacts 61b to apply D. C. voltage across the various head actuating solenoids shown in Fig. 5. A pair of selector switches indicated by the reference numerals 62 and 63 in Fig. 4 and mounted on the guide bar 34 (see Figs. 1 and 2) control a holding magnet 64 having three contacts 64a, 64b and 64c. Selector switch 62 is normally opened while selector switch 63 is normally closed.

Referring to Fig. 5, it is apparent that holding magnet contacts 64a and 64c are normally open and contacts 64b are normally closed. Contacts 64a and 64b are operable to control current to the cutting head solenoids 46, 46', 52 and 52' in accordance with predetermined combinations and permutations effective, in a manner which will become more apparent hereinafter, to maintain one head in condition to cut while the other is maintained clear of the work piece. Each head while in condition to cut is under the control of corresponding microswitches 38 and 39 which in turn take their signal from the cam templates 17 and 18. The high portions of the cams close the switches 38 and 39 while the low portions permit the switches to open.

Fig. 6 shows, schematically, the disposition of the various solenoids, motors, and switches.

The circuits of Figs. 4 and 5 are wired so as to control the checkering machine in the following manner:

Upon depression of the start button and instantaneous release thereof, holding magnet 61 is energized to close its contacts 61a and 61b to apply current across the circuitry of Figs. 4 and 5 respectively.

When contacts 61a are closed, motors $M_1$, $M_2$ and $M_3$ are energized while when contacts 61b are closed, D. C. voltage is available to energize the various elements shown in Fig. 5.

As the selector switches 62 and 63 are alternately actuated as the carriage 33 moves to and fro, solenoid 64 is energized and deenergized correspondingly allowing current to pass selectively through contacts 64a or 64b.

When contacts 64a are closed, solenoids 46 and 52' are energized, solenoid 52' being under the control of microswitch 39. When contacts 64b are closed, solenoids 46' and 52 are energized, solenoid 52 being under the control of microswitch 38.

The purpose of this circuitry as stated previously is to insure that one cutting head is maintained clear of the work piece while the other cutting head is in condition to cut. The following table will show the condition of solenoids 52, 52', 46 and 46' as the carriage is traversing from left to right and from right to left (as viewed in Fig. 1):

*Condition of key solenoids and switches when carriage is travelling from—*

| Solenoid or switch | Left to right | Right to left |
|---|---|---|
| 62 LR, 63 RL | Head 41 conditioned to cut. | Head 42 conditioned to cut. |
| 52 | Energization is under control of microswitch 38. | Out. |
| 52' | Out | Energization is under control of microswitch 39. |
| 46 | Out | Energized to hold head 41 against its stop 49. |
| 46' | Energized to hold head 42 against its stop 49a. | Out. |
| 64a | Open | Closed. |
| 64b | Closed | Open. |
| 64c | Open | Closed. |

As is apparent from the location of selector switches 62 and 63 (Figs. 1, 2 and 6) that the carriage in the course of its oscillation from right to left and left to right is constantly actuating these switches to develop the conditions set out in the table above. For example, assume that the switches are in the condition shown in Figs. 4 and 5, but with contacts 61a and 61b closed. Assume further that the carriage is moving from left to right. As the carriage approaches and momentarily strikes the plunger of selector switch 62, holding magnet 64 is energized to close its contacts 64a and 64c and to open contact 64b. As soon as the carriage begins its travel from right to left, selector switch 62 opens but magnet 64 remains energized because current flows through normally closed selector switch 63 and contact 64c. Cutting head 42 is now in condition to cut and does so under the control of microswitch 39 and cam templates 18.

When the carriage arrives at the location of selector switch 63, the switch is momentarily opened to deenergize magnet 64, opening contacts 64a and contacts 64c and closing contacts 64b. Thereafter, as the carriage returns to the right, selector switch 63 returns to its normally closed position but no current flows in holding magnet 64 because selector switch 62 is normally open and contacts 64c are open. In other words, holding magnet 64 is energized only when the carriage is moving from right to left and is deenergized when the carriage is moving from left to right.

Cutting head 41 is now conditioned to cut and does so under the control of microswitch 38 and cam templates 17.

From the above discussion, it is apparent that when the carriage is moving from left to right, the top cutting head 41 is conditioned to cut under the control of microswitch 38. At this time, holding magnet 64 is deenergized and contacts 64b are closed to energize solenoid 46' to hold the bottom head against its stop 49a. Solenoid 52 is energized under the control of microswitch 38 to generate the desired continuity and length of cut as the carriage moves from left to right.

Correspondingly, by virtue of the above circuitry when the carriage is moving from right to left, holding magnet 64 is energized to open its contacts 64b and to close contacts 64a and 64c whereby solenoid 46 is energized to haul the upper cutting head away from the work piece and against its stop 49 while solenoid 52' is energized under the control of its corresponding microswitch 39 to regulate groove cutting on the return stroke.

By virtue of the indexing scheme of the present invention a work piece is completely checkered in accordance with the configuration of the cam templates. The checkering pattern is readily changed by merely replacing the existing cam templates with another set having the desired configuration. It is possible to form intricate patterns such as letters, facsimiles of animals, birds or flowers upon the gun stock or other generally cylindrical work piece utilizing the principles of the present invention.

As stated previously, the indexing scheme is also utilized to insure a complete cycle of operation upon each work piece wherein the pin 59 indexes through 360 degrees in the course of a work cycle before blocking switch 57 to shut down the machine.

It is anticipated that various arrangements of circuitry may be devised for accomplishing control of the cutting heads and it is entirely within the scope and spirit of the invention that one skilled in the art may devise alternative arrangements thereof.

What is claimed is:

1. A gun stock checkering machine comprising a frame for rotatably supporting a gun stock, means for rotating the stock, a plurality of cutting heads each carrying a cutting element disposed about the periphery of the stock in circumferential array and each operable selectively to cut grooves therein, a carriage for supporting the cutting heads, means for moving the carriage to and fro with respect to the gun stock so that the carriage traverses a path generally parallel to the longitudinal axis of the gun stock, and interlocking means for coordinating the rotary motion of the gun stock and the traverse of the carriage effective to induce continuous and substantially uniform indexing of the stock with respect to the cutting element.

2. A gun stock checkering machine comprising a frame for rotatably supporting a gun stock, means for rotating the stock, a plurality of cutting heads each carrying a cutting element disposed about the periphery of the stock in circumferential array and each operable selectively to cut grooves therein, a carriage for supporting the cutting heads, means for moving the carriage to and fro with respect to the gun stock so that the carriage traverses a path generally parallel to the longitudinal axis of the gun stock, interlocking means for coordinating the rotary motion of the gun stock and the traverse of the carriage effective to induce continuous and substantially uniform indexing of the stock with respect to the cutting element, and control means cooperating with the carriage and effective to select the cutting heads so as to regulate the length and the continuity of said grooves in accordance with a predetermined pattern.

3. A gun stock checkering machine comprising a frame for rotatably supporting a gun stock, means for rotating the stock, a plurality of cutting heads each carrying a cutting element disposed about the periphery of the stock in circumferential array and each operable selectively to cut grooves in the stock, a carriage for supporting the cutting heads, means for moving the carriage to and fro with respect to the gun stock so that the carriage traverses a path generally parallel to the longitudinal axis of the gun stock, a first control means cooperating with the carriage and effective to select the cutting heads so as to regulate the length and continuity of said grooves in accordance with a predetermined pattern and a second control means individual to each cutting head and cooperating with the surface of the stock effective to regulate the depth of said grooves.

4. A gun stock checkering machine comprising a frame for rotatably supporting a gun stock, means for rotating the stock, a plurality of cutting heads each carrying a cutting element disposed about the periphery of the stock in circumferential array and each operable selectively to cut grooves in the stock, a carriage for supporting the cutting heads, means for moving the carriage to and fro with respect to the gun stock so that the carriage traverses a path generally parallel to the longitudinal axis of the gun stock, a first control means including cam templates cooperating with the carriage and effective to select the cutting heads so as to regulate the length and continuity of said grooves in accordance with a predetermined pattern and a second control means including a pair of relatively movable followers individual to each cutting head and cooperating with the surface of the stock effective to regulate the depth of said grooves.

5. A checkering machine comprising a frame for movably supporting at least one work piece, at least one cutting head carrying a cutting element positioned adjacent the work piece and adapted to cut grooves therein, a carriage for supporting the cutting head, means for continuously moving the carriage and the work piece relative to one another so that the cutting head is effective to generate in the work piece a thread-like groove having a predetermined lead and interlocking means for continuously coordinating motion of the carriage and motion of the work piece effective to induce continuous and substantially uniform indexing of the work piece with respect to the cutting element.

References Cited in the file of this patent

UNITED STATES PATENTS

| | | |
|---|---|---|
| 486,729 | Loepfe | Nov. 25, 1929 |
| 2,543,405 | Hayes | Feb. 27, 1951 |
| 2,573,565 | Hailston et al. | Oct. 30, 1951 |
| 2,638,946 | McDonald et al. | May 19, 1953 |

FOREIGN PATENTS

| | | |
|---|---|---|
| 280,484 | Great Britain | Nov. 17, 1927 |
| 949,845 | France | Mar. 7, 1949 |

UNITED STATES PATENT OFFICE
CERTIFICATE OF CORRECTION

Patent No. 2,850,060                                        September 2, 1958

Gordon J. Voelz

It is hereby certified that error appears in the printed specification of the above numbered patent requiring correction and that the said Letters Patent should read as corrected below.

Column 1, line 72, for "Serial No. 664,041" read -- Serial No. 644,041 --.

Signed and sealed this 18th day of November 1958.

(SEAL)
Attest:
KARL H. AXLINE
Attesting Officer

ROBERT C. WATSON
Commissioner of Patents